United States Patent [19]

Harvey

[11] Patent Number: 4,678,299
[45] Date of Patent: Jul. 7, 1987

[54] CAMERA DEVICE FOR ENCODING CONVENTIONAL FILM CARTRIDGE

[75] Inventor: Donald M. Harvey, Webster, N.Y.

[73] Assignee: Eastman Kodak Company, Rochester, N.Y.

[21] Appl. No.: 775,271

[22] Filed: Sep. 12, 1985

[51] Int. Cl.[4] .............................................. G03B 7/00
[52] U.S. Cl. ..................................... 354/21; 354/105; 352/78 C
[58] Field of Search ............ 352/78 R, 78 C; 354/21, 354/105, 106, 107, 108, 109, 275

[56] References Cited

U.S. PATENT DOCUMENTS

| | | | |
|---|---|---|---|
| 3,187,246 | 1/1940 | Nerwin | 88/1.5 |
| 3,490,844 | 1/1970 | Sapp, Jr. | 355/40 |
| 3,670,638 | 6/1972 | Lindsay | 95/31 |
| 3,672,277 | 6/1972 | Kobayashi | 95/31 |
| 3,724,935 | 4/1973 | Batter, Jr. | 352/78 C |
| 4,340,286 | 7/1982 | Carr | 354/105 |
| 4,443,077 | 4/1984 | Tanikawa | 354/21 |
| 4,490,027 | 12/1984 | Frank et al. | 354/21 |

*Primary Examiner*—Russell E. Adams
*Attorney, Agent, or Firm*—Roger A. Fields

[57] ABSTRACT

A particular type camera requiring the exposed film to receive special handling at the photofinisher has a loading chamber for receiving a conventional film cartridge in an axial direction. A back door of the camera is supported for closing movement to cover a film cartridge received in the loading chamber and for opening movement to permit the received cartridge to be removed in an axial direction from the chamber. An encoding means mounted on the back door has a finite range of influence within which the received cartridge is encoded with a detectable code mark to identify the cartridge to the photofinisher as one that was used in the particular type camera. Preferably, the encoding means is a magnet for magnetizing a macroscopic region of the received cartridge to encode the cartridge with a macroscopic magnetic field having a predetermined orientation. The magnet moves with the back door towards the received cartridge at least until the cartridge is within the finite range of the magnet, to encode the cartridge with the macroscopic magnetic field, and moves with the door away from the received cartridge at least until the cartridge is outside the finite range of the magnet, to permit the cartridge to be removed in an axial direction from the loading chamber without the magnet altering the encoded magnetic field.

9 Claims, 13 Drawing Figures

FIG. I

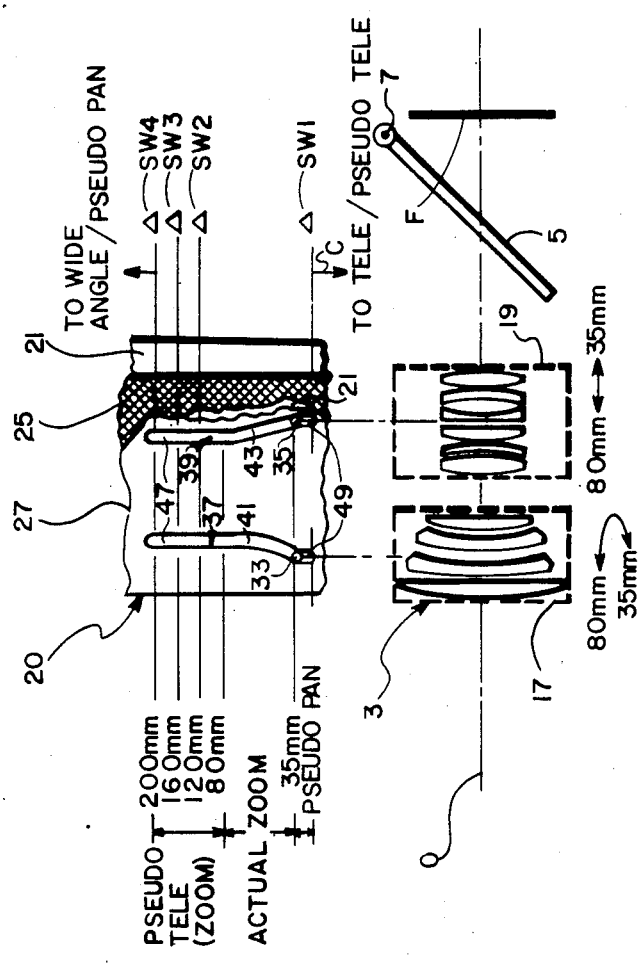

| OPERATING MODE | PSEUDO PAN | ACTUAL ZOOM | | PSEUDO TELE (ZOOM) | | |
|---|---|---|---|---|---|---|
| CAMERA OBJECTIVE: | | | | | | |
| ACTUAL FOCAL LENGTH | 35mm | 35mm | 80mm | 80mm | 80mm | 80mm |
| MAGNIFICATION | 1.0X | 1.0X | 2.3X | 2.3X | 2.3X | 2.3X |
| EQUIVALENT FOCAL LENGTH | | ←―――― SAME AS ACTUAL ――――→ | | 120mm | 160mm | 200mm |
| MAGNIFICATION | 1.0X | 1.0X | 2.3X | 3.4X | 4.6X | 5.7X |
| FINDER IMAGE | 1:2 | 3½:5 | 3½:5 | 3½:5 | 3½:5 | 3½:5 |
| WIDTH-TO-LENGTH RATIO | | | | | | |
| PORTION OF NEGATIVE USED TO MAKE PRINT | 16.4×32.8mm | 23×32.8mm | 23×32.8mm | 16.4×23.4mm | 12.8×16.3mm | 9.2×13.1mm |
| PRINT SIZE | 3½×7ins | 3½×5ins | 3½×5ins | 3½×5ins | 3½×5ins | 3½×5ins |
| CODE FIDUCIAL | 1000 | 0000 | 0000 | 0100 | 0010 | 0001 |

FIG. 8

CAMERA DEVICE FOR ENCODING CONVENTIONAL FILM CARTRIDGE

CROSS-REFERENCE TO RELATED APPLICATIONS

Reference is made to commonly assigned, copending patent applications Ser. No. 765,977, filed Aug. 15, 1985 in the name of Donald M. Harvey and entitled PSEUDO FORMAT CAMERA AND SPECIAL FILM CARTRIDGE, and Ser. No. 775,296, filed Sept. 12, 1985 in the name of David E. Beach and entitled APPARATUS AND METHOD FOR IDENTIFYING A FILM CARTRIDGE USED IN A PARTICULAR TYPE CAMERA.

BACKGROUND OF THE INVENTION

1. Field of the Invention

The invention relates generally to improved apparatus for identifying conventional film cartridges used in a particular type camera, such as the pseudo format camera disclosed in the patent applications cross-referenced above. More particularly, the invention relates to improved apparatus for encoding film cartridges used in the pseudo format camera to distinguish the cartridges from similar ones used in normal format cameras. This is done in order to route film cartridges used in the pseudo format camera to corresponding equipment at the photofinisher for producing pseudo format prints.

2. Description of the Prior Art

A pseudo telephoto print is one that is made from a central portion of an exposure having the same width-to-length ratio, e.g., $3\frac{1}{2}:5$, as that of the exposure. During the printing process, the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus, the print will have a telephoto or close-up format.

A pseudo panoramic print is one that is made from a narrow portion of an exposure having a greater width-to-length ratio, e.g., 1:3, than that of the exposure. During the printing process, the negative is masked at its upper and/or lower marginal zones, leaving the narrow portion of the negative unobscured. Alternatively, the film gate in the enlarger may be correspondingly masked or adjusted. Then an enlargement is made of the narrow portion of the negative to provide a print with the same width-to-length ratio as that of the narrow portion. Thus, the print will have a panoramic or elongate format.

Commonly assigned U.S. Pat. No. 3,490,844, granted Jan. 20, 1970, discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia which represents the selected portion of the subject; (5) processing the film to obtain a negative of the latent image of the subject; and (6) sensing the indicia to make a print of the selected portion of the subject from the negative.

When, in U.S. Pat. No. 3,490,844, the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

Another patent, U.S. Pat. No. 4,357,102, granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unobscured portion of the window. Printing paper with a similar width-to-length ratio is used. Prints can thus be obtained which have a panoramic or elongate format, without using a panoramic lens.

Although U.S. Pat. No. 3,490,844 discloses a method of making pseudo telephoto prints from exposures taken without a telephoto lens, and U.S. Pat. No. 4,357,102 discloses a method of making pseudo panoramic prints from exposures taken without a panoramic lens, in each instance the exposures are made on film in a conventional (standard) cartridge. Thus, unless otherwise provided by the photographer, there is no indication to the photofinisher that the conventional cartridge was used in a pseudo telephoto or pseudo panoramic camera rather than a regular format camera. During the photofinishing process, a cartridge containing film on which exposures have been made for use in producing pseudo telephoto or pseudo panoramic prints will be indistinguishable from a cartridge containing film on which exposures have been made for use in producing normal prints. Consequently, film on which exposures have been made for use in producing pseudo telephoto or pseudo panoramic prints may not be correctly routed to the special equipment described in the patents for producing pseudo telephoto or pseudo panoramic prints.

DESCRIPTION OF THE CROSS-REFERENCED APPLICATIONS

The earlier filed cross-referenced Harvey application discloses a camera adapted to receive a special film cartridge for taking exposures for use in producing pseudo telephoto and/or pseudo panoramic prints. The special cartridge is distinguishable physically from a conventional cartridge, preferably by an absence of the spool extension which projects from one end of the conventional cartridge. This enables the special cartridge to be identified for routing at the photofinisher to corresponding equipment for producing pseudo telephoto and pseudo panoramic prints. Thus, with the special cartridge, there cannot be any failure by the photofinisher to identify the cartridge as one containing film on which exposures have been made for use in producing pseudo format prints.

The cross-referenced Beach application filed on the same date as this patent application discloses a film cartridge having unique indicator means arranged within a discrete, dedicated area on an exterior surface of the cartridge. The indicator means may be physically altered by a corresponding member in the pseudo format camera to provide a visible indication that the cartridge was used in the pseudo format camera. Preferably, the indicator means is a light-reflecting material which is disfigured by a striker mounted on the back door of the pseudo format camera. The disfigured material will scatter reflected light, thereby providing an automatically determinable indication to the photofinisher that the cartridge was used in a pseudo format camera.

SUMMARY OF THE INVENTION

In the Harvey and Beach cross-referenced applications, the pseudo format camera is used with a special cartridge, that is, a film cartridge which is different than a conventional cartridge.

Conversely, according to my invention, there is provided improved apparatus for identifying conventional cartridges used in a particular type camera, such as the pseudo format camera. More particularly, there is provided improved apparatus for encoding conventional cartridges used in the pseudo format camera with a detectable code mark to distinguish the cartridges from similar ones used in normal format cameras. The pseudo format camera has a loading chamber for receiving a conventional cartridge in an axial direction. A back door of the camera is supported for closing movement to cover a film cartridge received in the loading chamber and for opening movement to permit the received cartridge to be removed in an axial direction from the chamber. An encoding means mounted on the back door has a finite range of influence within which the received cartridge is encoded with a detectable code mark to identify the cartridge to the photofinisher as one that was used in the pseudo format camera. Preferably, the encoding means is a magnet for magnetizing a macroscopic region of the received cartridge to encode the cartridge with a macroscopic magnetic field having a predetermined orientation. The magnet moves with the back door towards the received cartridge at least until the cartridge is within the finite range of the magnet, to encode the cartridge with the macroscopic magnetic field, and moves with the door away from the received cartridge at least until the cartridge is outside the finite range of the magnet, to permit the cartridge to be removed in the axial direction from the loading chamber without the magnet altering the encoded magnetic field. Thus, the encoded magnetic field will provide an automatically determinable indication to the photofinisher that the cartridge was used in the pseudo format camera.

BRIEF DESCRIPTION OF THE DRAWINGS

The invention will be described in connection with the drawings, wherein:

FIG. 5 is a schematic diagram of the camera objective and the manually operated member;

FIG. 8 is a chart for explaining how pseudo telephoto and pseudo panoramic prints are produced from film exposed in the camera.

DESCRIPTION OF THE PREFERRED EMBODIMENT

The invention is disclosed as being embodied preferably in a single-lens-reflux (SLR) 35 mm camera having a zoom objective lens. Because such a camera and lens are well known, this description is directed in particular to photographic elements forming part of or cooperating directly with the disclosed embodiment. It is to be understood, however, that other elements not specifically shown or described may take various forms known to persons of ordinary skill in the art.

Figure 1:
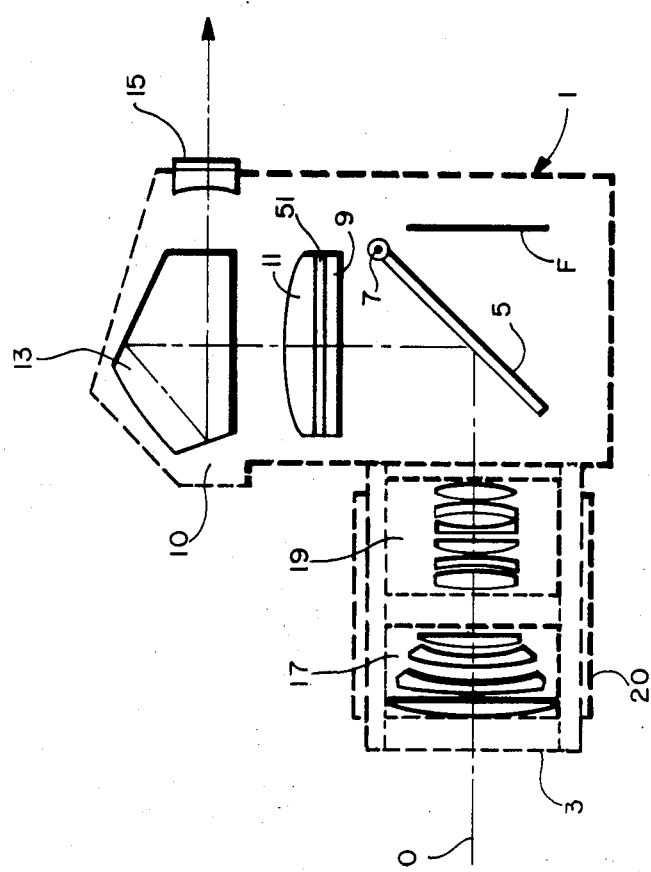
FIG. 1 is a side elevation view of a single-lens-reflex (SLR) camera adapted to receive a conventional film cartridge for taking exposures for use in producing pseudo telephoto and pseudo panoramic prints.

Referring now to the drawings, and in particular to FIG. 1, there is shown a single-lens-reflex (SLR) 35 mm camera 1. The camera 1 includes an objective lens 3 for focusing an image of a subject being photographed on a frame section F of film in a camera. Conventional means, such as a pressure plate and a pair of rails, not shown, support the film frame F in the focal plane of the objective lens 3 to take an exposure. A flip-up mirror 5 is located between the objective lens 3 and the film frame F. The mirror 5 is normally disposed at an angle of 45°, centered on the optical axis O of the objective lens 3, but can flip up about a pivot pin 7 to lie flat. When the mirror 5 is disposed at the 45° angle, it reflects the rays of light that come through the objective lens 3 onto a ground glass screen 9 in a viewfinder 10 of the camera 1. A field lens 11 and a penta-roof prism 13 in the viewfinder 10 direct the light rays through an eye-lens 15 at the rear of the camera 1 to enable the subject to be photographed to be viewed through the objective lens 3. The prism 13 has three reflecting surfaces which turn the image formed by the objective lens 3 on the ground glass screen 9 upright as well as right-way-round. When the mirror 5 is flipped up to lie flat, it covers the underside of the ground glass screen 9 and the light rays from the objective lens 3 fall on the film frame F. The position of the mirror 5 is so arranged that when an image of the subject to be photographed is focused on the ground glass screen 9, with the mirror at the 45° angle, the same image falls into focus on the film frame F when the mirror is flipped out of the way. Finger pressure against a shutter release, not shown, on the outside of the body of the camera 1 flips the mirror 5 up. At first the light rays fall only on the blind of a focal plane shutter, not shown, but as the mirror 5 reaches the upper limit of its travel, it presses against a stop which releases the shutter blades to make the exposure.

Figure 4:
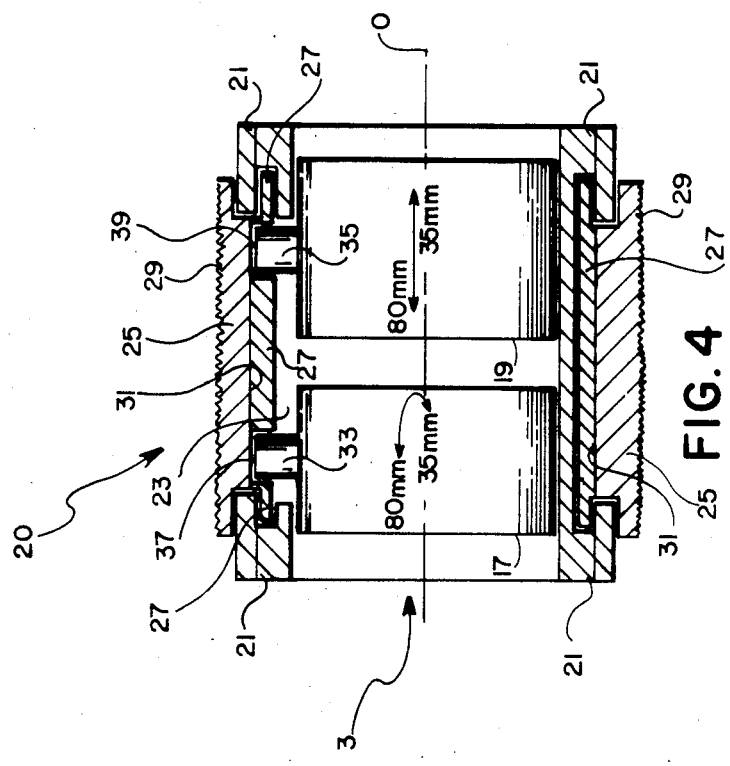
FIG. 4 is a partial sectional view of the camera objective and the manually operated member.

The objective lens 3 in the camera 1 is a known type of zoom lens, that is, a lens of variable focal length which can be adjusted continuously by movement of separate groups of elements in the lens to change the focal length of the lens. That is done in order to vary the angular field of view (coverage) of the objective lens 3 between a wide-angle limit and a telephoto limit. Alternatively, a lens assembly may be provided having a plurality of interchangeable elements for changing the focal length or angular field of view. As shown in FIGS. 1, 4 and 5, the objective lens 3 includes a front four-element section 17 which moves in a double action path along the optical axis O, first back (rearward) and then forward as the focal length of the lens is changed from a wide angle limit of, for example, 35 mm, to a telephoto limit of, for example, 80 mm. Conversely, a rear six-element section 19 of the objective lens 3 moves forward along the optical axis O in an almost smooth, linear path as the focal length of the lens is adjusted from 35 mm to 80 mm. At the shortest focal length of the objective lens 3, i.e., the wide-angle limit 35 mm, the front and rear sections 17 and 19 of the lens are farthest apart and the angular field of view is approximately 63°. At the longest focal length of the objective lens 3, i.e., the telephoto limit 80 mm, the angular field of view is approximately 280°. Thus, the field range of the objective lens 3 is 63° to 28°.

Figure 3:
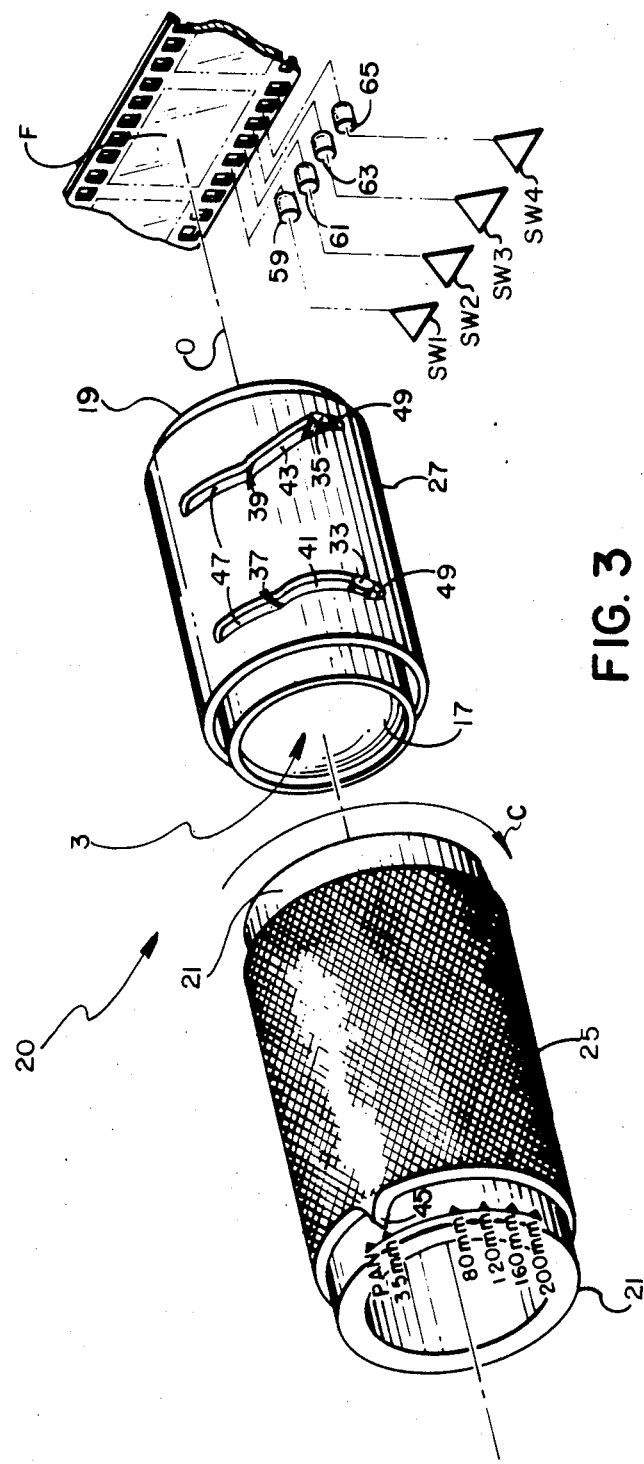
FIG. 3 is an exploded perspective view of the camera objective, a manually operated member for selecting a pseudo telephoto or pseudo panoramic field of view, and code means for encoding an exposure with indicia representative of the selected pseudo field of view.

Manually operated means 20 for moving the front and rear sections 17 and 19 of the objective lens 3 to adjust the lens to a selected focal length from 35 mm to 80 mm is shown in FIGS. 3-5. FIG. 3 shows the manually operated means 20 in an exploded perspective form. FIG. 4 shows such means 20 in a sectional form. FIG. 5 shows the means 20 in a rolled out (flat) elevational form. As seen in FIG. 4, a cylindrical barrel 21 fixed to the camera body supports the front and rear sections 17 and 19 of the objective lens 3 for movement along the optical axis O. The fixed barrel 21 has a semi-annular opening 23 which is bridged in light-trapping relation by an exterior zoom ring 25 and an interior cam ring 27. The zoom ring 25 has a knurled outer surface 29 and is secured at an inner surface 31 to the cam ring 27. The respective rings 25 and 27 are supported on exterior and interior surfaces of the barrel 21 for rotation relative to the barrel, about the front and rear sections 17 and 19 of the objective lens 3. The front and rear sections 17 and 19 have respective cam followers 33 and 35 which project into different-shaped cam slots 37 and 39 in the cam ring 27 to adjust the objective lens 3 from its 35 mm focal length to its 80 mm focal length or vice-versa. The different shape of the cam slots 37 and 39, and respective settings of the cam ring 27 for adjusting the objective lens 3 to the 35 mm focal length and the 80 mm focal length, are depicted in FIGS. 3 and 5. When, as viewed in FIGS. 3 and 5, the cam ring 27 is rotated in a clockwise direction C (by turning the zoom ring 25 in the same direction) from the 35 mm setting to the 80 mm setting of the cam ring, the front section 17 of the objective lens 3 first moves rearward and then moves forward because of a curved segment 41 of the cam slot 37. Simultaneously, the rear section 19 of the objective lens 3 simply moves forward because of a straight, inclined segment 43 of the cam slot 39. This movement of the front and rear sections 17 and 19 adjusts the objective lens 3 to continuously change its focal length from 35 mm to 80 mm.

A pointer 45 is provided on the zoom ring 25 for alignment with respective visible indications of the 35 mm and 80 mm settings of the cam ring 27. As shown in FIG. 3, the indications are embossed on the outside of the cylindrical barrel 21.

As is apparent from FIG. 5, the cam ring 27 can be rotated in the clockwise direction C beyond its 80 mm setting (by similarly turning the zoom ring 25) to a plurality of pseudo telephoto settings, 120 mm, 160 mm and 200 mm, without moving the objective lens 3 from its longest (telephoto) focal length 80 mm. This is possible because of respective, non-inclined, identical dwell segments 47 in the two cam slots 37 and 39. Conversely, the cam ring 27 can be rotated in a counter-clockwise direction beyond its 35 mm setting (by similarly turning the zoom ring 25) to a pseudo panoramic setting, without moving the objective lens 3 from its shortest (wide-angle) focal length 35 mm. This is possible because of respective, non-inclined, identical dwell segments 49 in the two cam slots 37 and 39. Visible indications of the pseudo telephoto settings 120 mm, 160 mm and 200 mm of the cam ring 27 and the pseudo panoramic setting of the cam ring are embossed on the outside of the cylindrical barrel 21, beyond the 80 mm and 35 mm indications on the barrel, for alignment with the pointer 45 on the zoom ring 25.

Figure 6A:
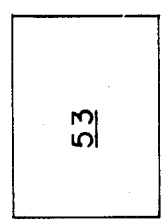
FIGS. 6a–6e are elevation views of the finder field in the viewfinder of the camera, illustrating operation of a liquid crystal display (LCD) masking unit for partially masking the viewing area in various degrees corresponding to the selected pseudo field of view.
Figure 6B:
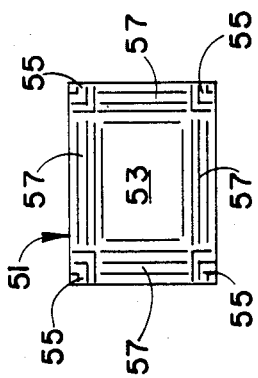
Figure 6C:
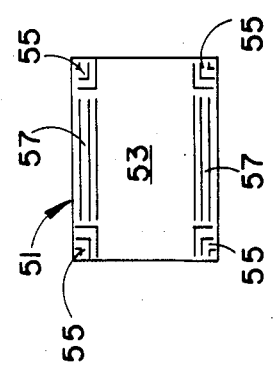
Figure 6D:
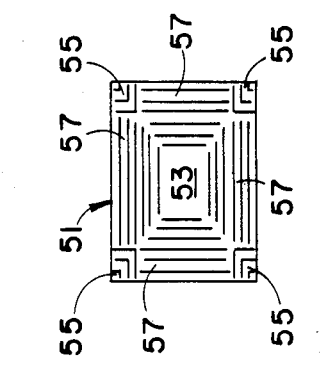
Figure 6E:
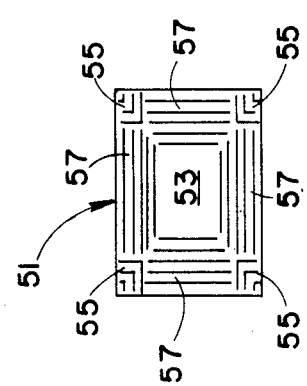

A flat, liquid crystal display (LCD) masking unit 51 is located in the viewfinder 10 of the camera 1 between the ground glass screen 9 and the field lens 11, as shown in FIG. 1. The LCD masking unit 51 is a variation of a known type of unit, such as described in U.S. Pat. No. 4,478,493, granted Oct. 23, 1984, and is depicted in FIGS. 6b-6e in various masking configurations in the finder field 53 of the viewfinder 10. The respective configurations correspond to the pseudo panoramic and pseudo telephoto settings of the cam ring 27. As shown in FIG. 6e, the masking unit 51 comprises four sets of right-angle insulated strips 55 of transparent, electrically conductive material arranged in side-by-side relation in the respective corner zones of the finder field 53 and four sets of elongate insulated strips 57 of the same material arranged in side-by-side relation in the upper, lower, left and right marginal zones of the finder field. Preferably, each set of the right-angle strips 55 includes three strips, and each set of the elongate strips 57 includes six strips. When the right-angle strips 55 and the elongate strips 57 are selectively energized in accordance with the pseudo panoramic or pseudo telephoto settings of the cam ring 27, they are individually rendered opaque to partially mask the finder field 53 in various degrees, as shown in FIGS. 6b-6e. FIG. 6a illustrates the finder field 53 as it appears with the masking unit 51 de-energized, which is the situation when the cam ring 27 is rotated from its 35 mm setting to its 80 mm setting or vice-versa. In this instance, none of the right-angle strips 55 or the elongate strips 57 are visible in the finder field 53. FIG. 6b illustrates the finder field 53 as it appears with the masking unit 51 minimally energized to provide a pseudo panoramic format, which is the situation when the cam ring 27 is an its pseudo panoramic setting. In this instance, three of the elongate strips 57 in the upper and lower marginal zones and all of the right-angle strips 55 in the corner zones are visible in the finder field 53. FIG. 6c illustrates the finder field 53 as it appears with the masking unit 61 further energized to provide a pseudo telephoto format skin to a 120 mm focal length, which is the situation when the cam ring 27 is in its 120 mm pseudo telephoto setting. In this instance, four of the elongate strips 57 in the upper, lower, left and right marginal zones and all of the right-angle strips 55 in the corner zones are visible in the finder field 53. FIG. 6d illustrates the finder field as it appears with the masking unit even further energized to provide a pseudo telephoto format akin to a 160 mm focal length, which is the situation when the cam ring is in its 160 mm pseudo telephoto setting. In this instance, five of the elongate strips in the marginal zones and all of the right-angle strips in the corner zones are visible in the finder field. FIG. 6e illustrates the finder field as it appears with the masking unit completely energized to provide a pseudo telephoto format akin to a 200 mm focal length, which is the situation when the cam ring is in its 200 mm pseudo telephoto setting. In this instance, all of the elongate strips and all of the right-angle strips are visible in the finder field.

In contrast to the electrically controlled LCD masking unit 51, a mechanically controlled masking unit may be provided in the viewfinder 10 of the camera 1. An example of a mechanical unit is shown in U.S. Pat. No. 3,212,422, granted Oct. 19, 1965. Alternatively, in place of the LCD masking unit 51, there may be provided a viewfinder having a manually operated carriage or slide on which is mounted a series of lenses and/or apertures of different sizes corresponding to the pseudo telephoto and pseudo panoramic formats. The slide would be supported for movement across the viewing axis of the viewfinder to locate the respective lenses and/or apertures at the axis to see a selected pseudo format in the viewfinder. In addition to the lenses and/or apertures for viewing the pseudo formats, the slide may include one or more lenses for viewing regular formats, e.g., 50 mm.

Four light emitting diodes (LED's) 59, 61, 63 and 65 are disposed in evenly spaced relation in the camera 1 for selective energization to spot-expose one of several possible code fiducials in binary form on a sensitive film area adjacent the film frame F, as shown in FIG. 3. Selective energization of the LED's 59, 61, 63 and 65 is controlled by individually closing respective switches SW1, SW2, SW3 and SW4. The closing of a switch SW1, SW2, SW3 or SW4 may be effected by a single closure member, not shown, on the cam ring 27 as the cam ring is positioned selectively in its pseudo panoramic and pseudo telephoto settings, i.e., pan, 120 mm, 160 mm and 200 mm. The binary form of the resulting code fiducial adjacent the film frame F indicates the particular pseudo setting of the cam ring 27, that is, the selected pseudo format. When the cam ring 27 is in its pseudo panoramic setting, the switch SW1 is closed and the LED 59 is energized. Thus, the binary form of the code fiducial is 1000. When the cam ring 27 is in its 120 mm, 160 mm or 200 mm pseudo telephoto settings, the switches SW2, SW3 or SW4 are closed and the LED's 61, 63 or 65 are energized, respectively. Thus, the binary form of the code fiducial is 0100, 0010 or 0001. When the cam ring 27 is rotated from its 35 mm setting to its 80 mm setting or vice-versa, the switches SW1–SW4 are open and none of the LED's are energized. Thus, the binary form of the code fiducial is, in effect, 0000.

Although not shown, it may be desirable for the LED 59 to be energized each time the cam ring 27 is in a pseudo panoramic or pseudo telephoto setting. In this instance, the LED 59 would provide a reference or pseudo-indicator fiducial for use in the printing process and the LED's 61, 63 and 65 would provide the code fiducials. Thus, the various codings might be 1000, 1100, 1010 and 1001 for the panoramic, 120 mm, 160 mm and 200 mm pseudo settings, respectively.

Besides controlling selective energization of the LED's 59, 61, 63 and 65 in accordance with rotation of the cam ring 27 to its pseudo panoramic and pseudo telephoto settings, the switches SW1–SW4 similarly control selective energization of the right-angle strips 55 and the elongate strips 57 of the LCD masking unit 51. Thus, the resulting code fiducial 1000, 0100, 0010 or 0001 adjacent the film frame F will be consistent with the masking configuration in the finder field 53 of the viewfinder 10.

Figure 7:
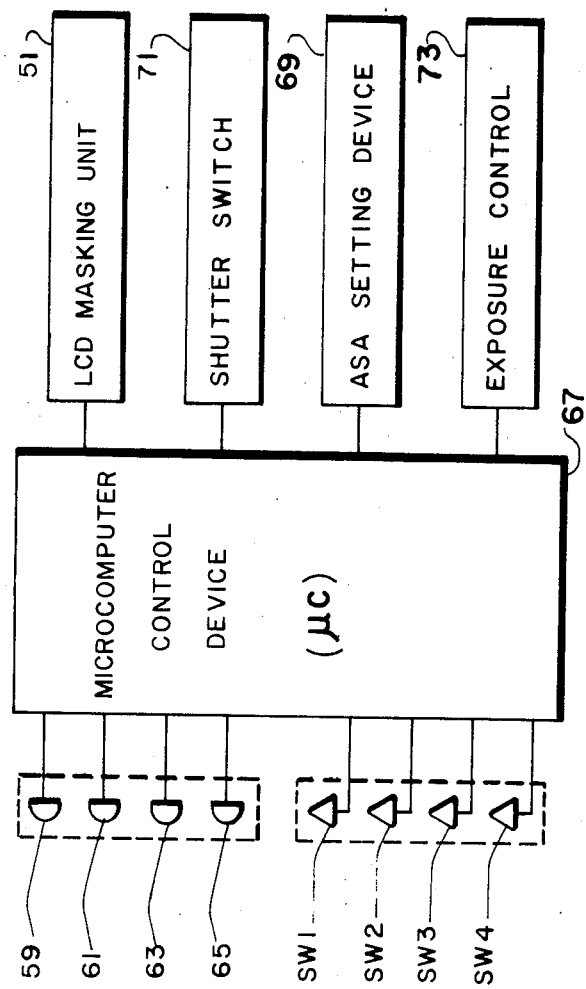
FIG. 7 is a schematic diagram of control circuitry in the camera.

FIG. 7 depicts a known microcomputer control device 67 which operatively couples the switches SW1–SW4 with the LCD masking unit 51 and the LED's 59, 61, 63 and 65. Examples of microcomputer-controlled cameras are disclosed in U.S. Pat. Nos. 4,295,715 and 4,509,843. A known ASA (film speed) setting device 69 is connected to the microcomputer device 67 to limit the intensity of an energized LED in accordance with the particular film speed of the 35 mm film loaded in the camera 1. A shutter switch 71 is connected to the microcomputer device 67 to delay energization of an LED, even though one of the switches SW1–SW4 is closed, until a focal plane shutter, not shown, is opened to take an exposure. When the focal plane shutter is opened, the shutter switch 71 is closed to energize an LED. Conversely, closing of the focal plane shutter causes the shutter switch 71 to re-open, thereby de-energizing the LED. A conventional exposure control circuit 73 is connected to the microcomputer device 67 to control the diaphragm aperture and the shutter speed. Such a circuit is disclosed, for example, in U.S. Pat. Nos. 4,493,547 and 4,515,457. The microcomputer device 67 may include a typical look-up table of exposure values which are individually selected according to which one of the switches SW1–SW4 is closed and the measure of brightness of reflected light provided by a photocell in the exposure control circuit 73. The selected exposure value is inputted to the exposure control circuit to set the diaphragm aperture and the shutter speed.

Referring now to FIG. 8, there is shown a chart for understanding how the camera 1 is used to exposure film frames from which pseudo panoramic and pseudo telephoto prints (as well as actual wide-angle to actual telephoto prints) can be obtained. For the most part, the chart is self-explanatory. For example, when the cam ring 27 is in its pseudo panoramic setting, the actual focal length of the objective lens 3 is the wide angle limit 35 mm. The finder field 53 is masked, as indicated, and the code fiducial 1000 is exposed adjacent the film frame F in response to the closing of the switch SW1. During the printing operation, sensing of the code fiducial 1000 causes the negative to be masked along its upper and lower marginal zones, as indicated, in conformity with the masking of the finder field 53. An enlargement is made of the narrowed, non-masked portion of the negative, i.e., 16.4×32.8 mm, to provide a pseudo panoramic 3½×7 ins. print similar to the one obtained from an exposure made with a panoramic (rather than a 35 mm) lens. When the cam ring 27 is in its 200 mm pseudo telephoto setting, the actual focal length of the objective lens 3 is the telephoto limit 80 mm. The finder field 53 is masked, as indicated, and the code fiducial 0001 is exposed adjacent the film frame F in response to the closing of the switch SW4. During the printing operation, sensing of the code fiducial 0001 causes the negative to be masked along its upper, lower, left and right marginal zones, as indicated, in conformity with the masking of the finder field. An enlargement is made of the central, non-masked portion of the negative, i.e., 9.2×13.1 mm, to provide a pseudo telephoto 3½×5 ins. print similar to one obtained from an exposure made with a 200 mm (rather than a 80 mm) lens. When the cam ring 27 is in its 120 mm telephoto setting, the actual focal length of the objective lens 3 is the telephoto limit 80 mm. The finder field 53 is masked, as indicated, and the code fiducial 0100 is exposed adjacent the film frame F is response to the closing of the switch SW2. During the printing operation, sensing of the code fiducial 0100 causes the negative to be masked along its upper, lower, left and right marginal zones, as indicated, in conformity with the masking of the finder field. An enlargement is made of the central, non-masked portion of the negative, i.e., 16.4×23.4 mm, to provide a pseudo telephoto 3½×5 ins. print similar to one obtained from an exposure made with a 120 mm (rather than a 80 mm) lens. When the cam ring is rotated from its 35 mm setting to its 80 mm setting or vice-versa, the focal length of the objective lens 3 is continuously changed between 35 mm and 80 mm. The finder field is not masked and no code fiducial (0000) is exposed on the film frame F, since each of the switches SW1–SW4 is open. Thus, an enlargement is made of a substantial portion of the negative, i.e., 23×32.8 mm.

Figure 2:
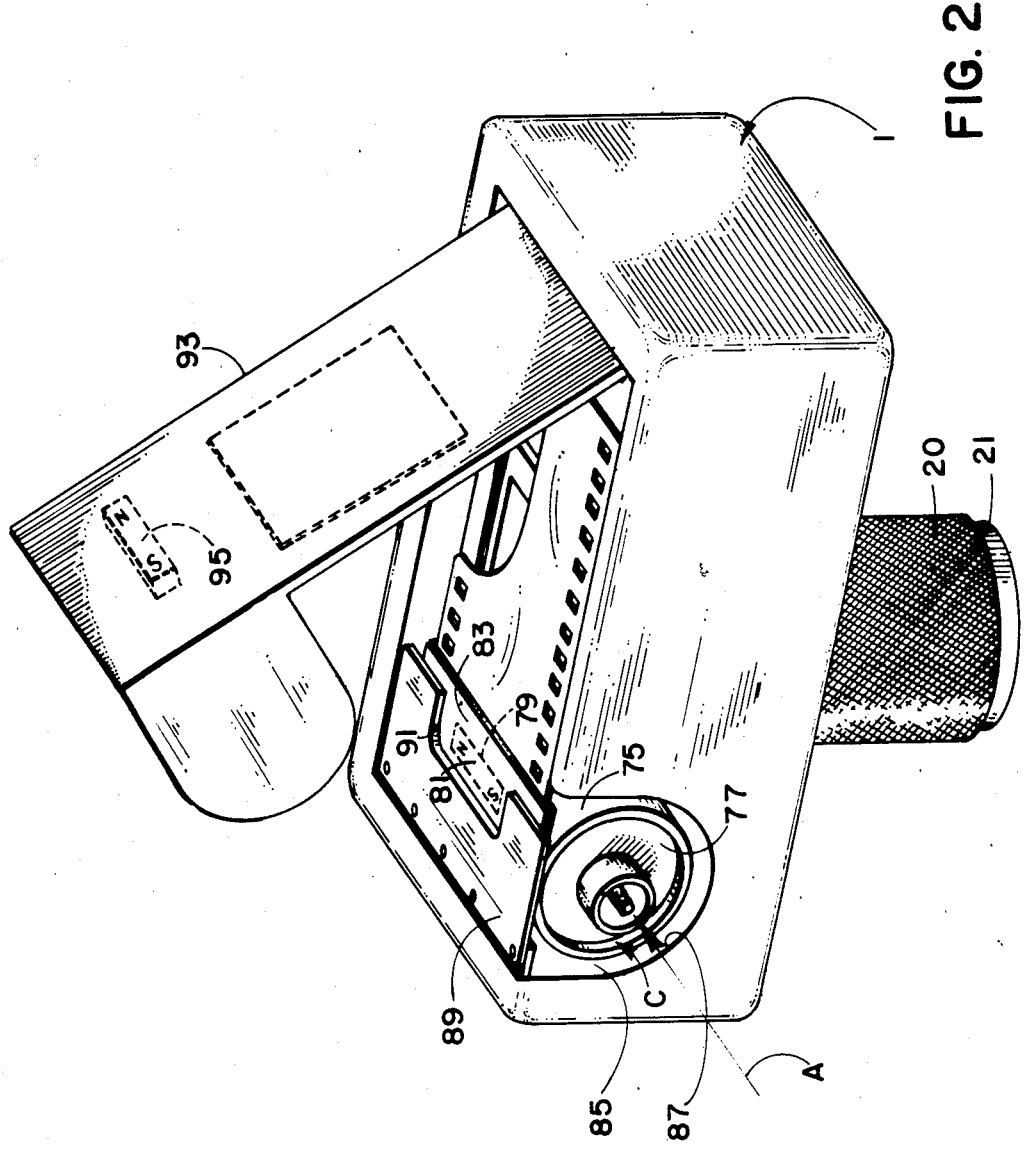
FIG. 2 is a rear perspective view of the camera and the cartridge, depicting the manner in which a magnet on a back door of the camera encodes the cartridge to identify the cartridge as one that was used in the camera, according to a preferred embodiment of the invention.

As shown in FIG. 2, the camera 1 is used with a conventional (standard) 35 mm film cartridge C, such as that manufactured by Eastman Kodak Company. The film cartridge C comprises a light-tight container 75 formed from sheet metal and having a pair of metal end caps 77. A test of the container 75 revealed that the sheet metal is ferromagnetic, that is, it will support appreciable residual magnetism after being magnetized. According to the invention, the container 75 is encoded to identify the cartridge C as one that was used in the camera 1 by permanently magnetizing a macroscopic region 79 on the exterior surface of the container. The resulting code mark on the container 75 is a macroscopic magnetic field 81 having a predetermined north-south pole orientation with respect to a flat portion 83 of the container. The term macroscopic is employed to distinguish the magnetic code mark from those situations in which magnetic recording heads magnetize small microscopic regions of magnetic material, such as magnetic tape. The macroscopic magnetic field 81 generated by the container 75 will provide an automatically determinable indication to the photofinisher that the cartridge C was used in the camera 1. Thus, the cartridge can be routed by the photofinisher to special equipment for producing pseudo telephoto or pseudo panoramic prints.

The macroscopic magnetic field 81 generated by the container 75 may be sensed electronically or mechanically at the photofinisher. To enhance the strength and staying power of the magnetic field 81, the container 75 may be constructed of a high coercivity metal. Alternatively, the macroscopic region 79 of the container 75 may be coated with a similar material.

The camera 1, shown in FIG. 2, includes a loading chamber 85 having a bottom opening 87 for receiving the film cartridge C end first, i.e., in the axial direction A, into the chamber. A plastic plate 89, secured to the body of the camera 1, extends across the chamber 85 at the rear of the camera to maintain the received cartridge C in place within the chamber. The plastic plate 89 has a cut-out 91 to allow access to the macroscopic region 79 of the received cartridge C. A back door 93 of the camera 1 is pivotally supported remote from the chamber 85 for closing movement to cover the received cartridge C and for opening movement to permit removal of the cartridge end first through the bottom opening 87. A permanent magnet 95 (or other magnetic encoding means) is mounted on the inside of the back door 93 for magnetizing the macroscopic region 79 of the received cartridge C to encode such region with the macroscopic magnetic field 81. When the back door 93 is closed, the magnet 95 moves with the door towards the received cartridge C at least until the cartridge is within the magnetizing range of the magnet and thereby encodes the cartridge with the macroscopic magnetic field 81. Preferably, the magnet 95 moves within the space provided by the cut-out 91 in the plastic plate 89 to substantially contact the flat portion 83 of the received cartridge C. When the back door 93 is opened, the magnet 95 separates sufficiently from the flat portion 83 of the received cartridge C to permit removal of the cartridge from the chamber 85, in an axial direction opposite to the direction A, without the magnet altering the macroscopic magnetic field 81 encoded on the cartridge.

Figure 9:
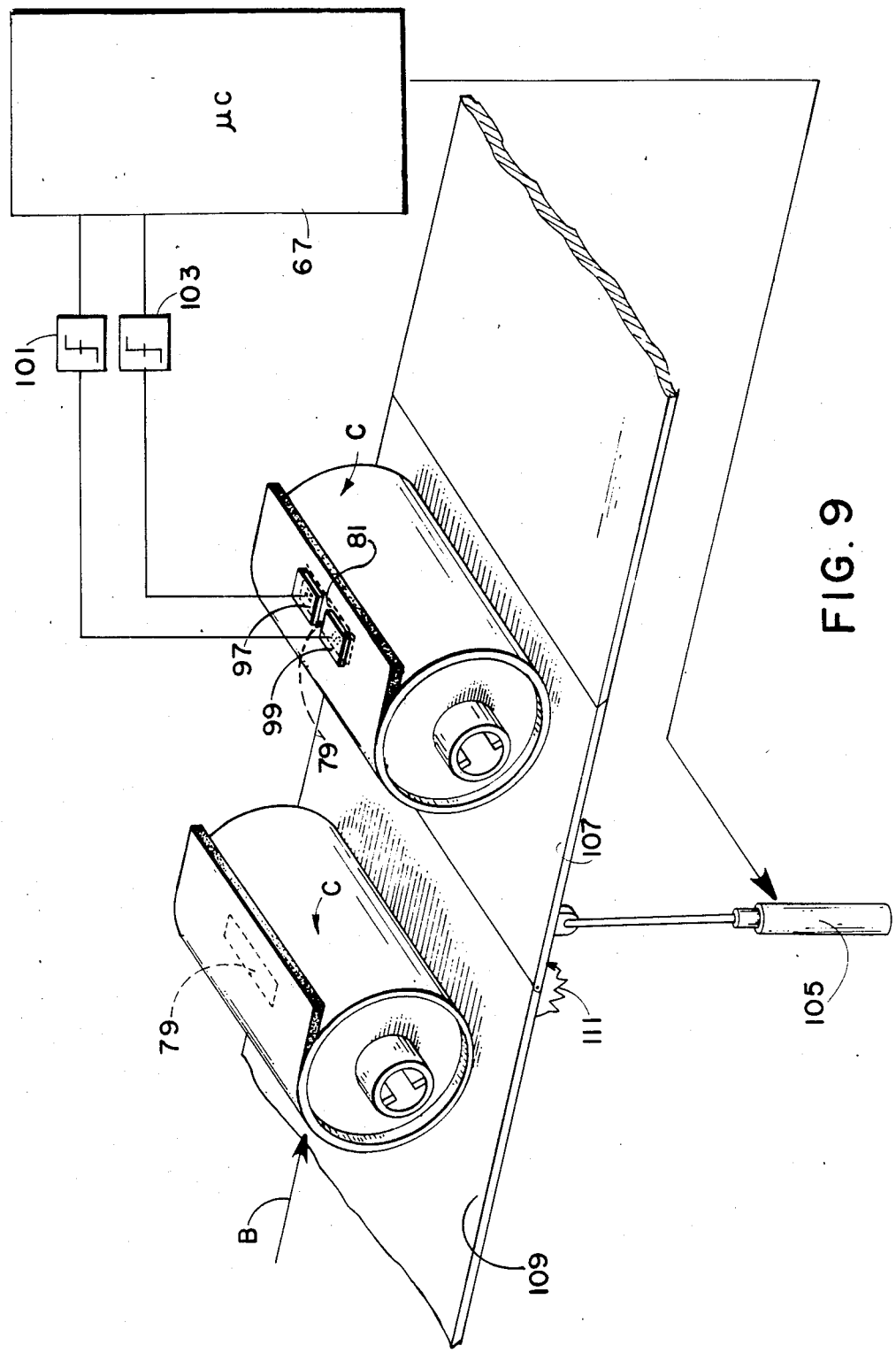
FIG. 9 is a schematic diagram depicting apparatus for determining whether a film cartridge was used in the camera.

Apparatus at the photofinisher for determining whether a film cartridge was used in the camera 1, that is, for determining whether the cartridge is encoded with the macroscopic magnetic field 81, is shown in FIG. 9. A pair of known Hall effect sensors 97 and 99, such as disclosed in U.S. Pat. No. 4,490,027, are oriented with respect to the macroscopic region 79 of successive film cartridges C to determine whether such region generates the macroscopic magnetic field 81. The outputs of the Hall effect sensors 97 and 99 are provided respectively to a pair of Schmidt triggers 101 and 103. In turn, the outputs of the Schmidt triggers 101 and 103 are provided to the microcomputer control device 67, previously described. The outputs of the Hall effect sensors 97 and 99 are digitized by the Schmidt triggers 101 and 103 to yield respective binary logic signals which, when received by the microcomputer control device 67, cause the device to momentarily energize a solenoid 105. The energized solenoid 105 pivots open a trap door 107 in a slide 109 along which each film cartridge is moved in the direction B. Thus, as can be appreciated by viewing FIG. 9, a film cartridge encoded with the macroscopic magnetic field 81 will be separated from a non-coded cartridge. Then, a return spring 111 will close the trap door 107.

While the invention has been described with reference to a preferred embodiment, it will be understood that various modifications may be effected within the ordinary skill in the art without departing from the scope of the invention.

I claim:

1. An improved photographic camera for use with a film cartridge, wherein said camera is of the type having a loading chamber for receiving the cartridge in an axial direction, wherein the improvement comprises:
   continuously active encoding means for applying an alterable code mark to a film cartridge received in said loading chamber, said encoding means having a finite range of influence within which the received cartridge is encoded with the alterable mark; and means supporting said encoding means for movement towards the received cartridge at least until the cartridge is within the finite range of said encoding means, to encode the cartridge with the alterable mark, and for movement away from the received cartridge at least until the cartridge is outside the finite range of said encoding means, to permit the cartridge to be removed in an axial direction from said loading chamber without said cartridge removal altering the encoded mark.

2. The improvement as recited in claim 1, wherein said loading chamber receives a film cartridge having axially opposed ends and said supporting means supports said encoding means for movement to substantially contact the received cartridge between its axially opposed ends, to encode the cartridge with the alterable mark, and for movement to separate from the received cartridge, to permit removal of the cartridge in an axial direction from said loading chamber without altering the encoded mark.

3. An improved photographic camera for use with a film cartridge, wherein said camera is of the type having a loading chamber for receiving the cartridge and a back door supported for closing movement to cover a cartridge received in said loading chamber, and wherein the improvement comprises:

encoding means for substantially contacting a film cartridge received in said loading chamber to encode the received cartridge with a code mark; and means mounting said encoding means for concurrent movement with said back door to substantially contact the received cartridge in response to closing movement of said back door, whereby said encoding means will encode the received cartridge.

4. The improvement as recited in claim 3, wherein said mounting means mounts said encoding means on said back door for closing movement with the door.

5. An improved photographic camera for use with a film cartridge, wherein said camera is of the type having a loading chamber for receiving the cartridge in an axial direction and a back door supported for closing movement to cover a cartridge received in said loading chamber and for opening movement to permit the received cartridge to be removed in an axial direction from the chamber, and wherein the improvement comprises:

encoding means for encoding a film cartridge received in said loading chamber with an alterable code mark, said encoding means having a finite range of influence within which the received cartridge is encoded with the alterable mark; and means mounting said encoding means on said back door for closing movement with the door towards the received cartridge at least until the cartridge is within the finite range of said encoding means, to encode the cartridge with the alterable mark, and for opening movement with said back door away from the received cartridge at least until the cartridge is outside the finite range of said encoding means, to permit the cartridge to be removed in an axial direction from said loading chamber without said encoding means altering the encoded mark.

6. An improved photographic camera for use with a film cartridge including a light-tight metal container, wherein said camera is of the type having a loading chamber for receiving the cartridge in an axial direction, and wherein the improvement comprises:

magnetic encoding means for magnetizing a macroscopic region of the metal container of a film cartridge received in said loading chamber to encode the metal container with a macroscopic magnetic field; and means supporting said magnetic encoding means for movement towards the metal container of the received cartridge to encode the metal container with the macroscopic magnetic field and for movement away from the metal container to permit the received cartridge to be removed in an axial direction from said loading chamber without said encoding means altering the encoded magnetic field.

7. The improvement as recited in claim 6, wherein said loading chamber receives a film cartridge including a metal container having axially opposed ends and said supporting means supports said magnetic encoding means for movement to substantially contact a macroscopic region of the metal container between the axially opposed ends of the container, to encode the container with the macroscopic magnetic field, and for movement to separate from the metal container, to permit removal of the cartridge in an axial direction from said loading chamber without altering the encoded magnetic field.

8. An improved photographic camera for use with a film cartridge including a light-tight metal container, wherein said camera is of the type having a loading chamber for receiving the cartridge in an axial direction and a back door supported for closing movement to cover a cartridge received in said loading chamber and for opening movement to permit the received cartridge to be removed in an axial direction from the chamber, and wherein the improvement comprises:

magnetic encoding means for magnetizing a macroscopic region of the metal container of a film cartridge received in said loading chamber to encode the metal container with a macroscopic magnetic field having a predetermined north-south pole orientation; and means mounting said magnetic encoding means on said back door for closing movement with the door towards the macroscopic region of the metal container of the received cartridge, to encode the metal container with the macroscopic magnetic field, and for opening movement with said back door away from the macroscopic region of the metal container, to permit the received cartridge to be removed in an axial direction from said loading chamber without said encoding means altering the encoded magnetic field.

9. The improvement as recited in claim 8, wherein said camera includes means for taking exposures for use in producing pseudo format prints from a selected portion of a negative and said magnetic encoding means encodes the metal container of a received film cartridge with said macroscopic magnetic field to indicate that the cartridge contains film having exposures for use in producing pseudo format prints.

* * * * *